(12) United States Patent
Yamazaki et al.

(10) Patent No.: US 11,496,400 B2
(45) Date of Patent: Nov. 8, 2022

(54) NETWORK LOAD DISPERSION DEVICE AND METHOD

(71) Applicant: Nippon Telegraph and Telephone Corporation, Tokyo (JP)

(72) Inventors: Koji Yamazaki, Tokyo (JP); Saki Hatta, Tokyo (JP); Shoko Oteru, Tokyo (JP); Tomoaki Kawamura, Tokyo (JP); Yuta Ukon, Tokyo (JP); Shuhei Yoshida, Tokyo (JP); Koyo Nitta, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 3 days.

(21) Appl. No.: 17/258,384

(22) PCT Filed: Jul. 5, 2019

(86) PCT No.: PCT/JP2019/026816
§ 371 (c)(1),
(2) Date: Jan. 6, 2021

(87) PCT Pub. No.: WO2020/013095
PCT Pub. Date: Jan. 16, 2020

(65) Prior Publication Data
US 2021/0281517 A1    Sep. 9, 2021

(30) Foreign Application Priority Data

Jul. 9, 2018  (JP) .............................. JP2018-129760

(51) Int. Cl.
*H04L 47/125* (2022.01)
(52) U.S. Cl.
CPC ................................ *H04L 47/125* (2013.01)

(58) Field of Classification Search
CPC .............. H04L 47/125; H04L 45/7453; H04L 43/0888; H04L 47/2433; H04L 41/0823; H04L 67/1023
See application file for complete search history.

(56) References Cited

U.S. PATENT DOCUMENTS 10,320,568 B1 * 6/2019 Mao ..................... H04L 9/0894
2015/0049764 A1 * 2/2015 Hieda ................. H04L 67/1097
370/392

(Continued)

FOREIGN PATENT DOCUMENTS

JP      2017139597 A    8/2017

OTHER PUBLICATIONS

Intel, "Intel Ethernet® Controller X710/XXV710/XL710 Datasheet," Ethernet Networking Division (ND), Feb. 2018, 1708 pages.

(Continued)

*Primary Examiner* — Donald L Mills
(74) *Attorney, Agent, or Firm* — Slater Matsil, LLP

(57) ABSTRACT

A network load balancing apparatus has a data buffer for each communication path of a received packet's transfer destinations, calculates a first hash value using a field value contained in the packet, determines, based on the field value of the packet or the first hash value, a communication path of a transfer destination of the packet subject to external transfer control for transmission to a predetermined external server, determines, based on the first hash value, a communication path of a transfer destination of the packet to be subject to priority control, determines, based on a second hash value based on the first hash value, a communication path of a transfer destination of the packet to be subject to load balancing control, to match a preset load balancing (Continued)

situation of the data buffer, and transmits the packet to a data buffer corresponding to the communication path of the transfer destination.

8 Claims, 7 Drawing Sheets

(56) References Cited

U.S. PATENT DOCUMENTS

2017/0034049 A1* 2/2017 Pfaff ........................ H04L 45/38
2019/0386913 A1* 12/2019 Wei ......................... H04L 47/30

OTHER PUBLICATIONS

Fumihiko S. et al., "A study about SPP design with countermeasure of data buffer overflow," NetroSphere: Towards the Transformation of Carrier Networks, Institute of Electronics, Information and Communication Engineers, Mar. 2018, 7 pages, Tokyo, Japan.

* cited by examiner

NETWORK LOAD DISPERSION DEVICE AND METHOD

CROSS-REFERENCE TO RELATED APPLICATIONS

This patent application is a national phase filing under section 371 of PCT/JP2019/026816, filed Jul. 5, 2019, which claims the priority of Japanese patent application 2018-129760, filed Jul. 9, 2018, each of which is incorporated herein by reference in its entirety.

TECHNICAL FIELD

The present invention relates to an apparatus for controlling destinations of packets, and particularly relates to a network load balancing apparatus and method that allows for a reduction of external transfer load, while ensuring quality of service (QoS) and realizing an improvement in throughput performance, by comprehensively incorporating priority control, load balancing and external transfer of specific packets in a communication server assistance apparatus.

BACKGROUND

Normally, a network configured based on Software-Defined Networking (SDN)/Network Function Virtualization (NFV) is made up of several general-purpose servers. A plurality of virtual machines (VMs) may be constructed in a general-purpose server and be used to process one application, or each VM may be used to process a plurality of applications.

Virtualized communication application software that runs on VMs in this way are known as Virtual Network Functions (VNFs). Since various VNFs can be run on a single general-purpose server, CAPEX/OPEX can be reduced compared to a conventional network configuration using dedicated apparatuses. Even among load balancing apparatuses which were generally configured by conventional dedicated hardware, apparatuses with more flexible configurations utilizing VNFs are known.

Meanwhile, as a packet transmission/reception interface of the general-purpose server, a general-purpose network adapter (Network Interface Card: NIC) is installed. In the general NIC disclosed in Non-patent Literature 1, received packets are accumulated in a data buffer, and are stored in a main memory in the server using Direct Memory Access (DMA) transfer.

Because the control method for distributing packets to the data buffer in the NIC is greatly affected by packet transfer performance and the functionalities that can be realized by the server system as a whole, the number of data buffers and the control method for distributing packets to multiple data buffers differ depending on the NIC. For example, by including a plurality of data buffers and performing load balancing control with respect to received packets, a plurality of CPU cores can perform the load balancing process to improve the throughput. In addition, by performing priority control of received packets occupying one data buffer and having a flow, packet reordering in the flow can be prevented.

In addition, in load balancing apparatuses with a configuration of a general-purpose server, a general-purpose NIC and VNFs, the predominant configuration is one wherein communication bottlenecks with the CPU are reduced using the I/O virtualization function Single-Root I/O Virtualization (SR-IOV) of the hardware of a general NIC mentioned above. However, in conventional load balancing apparatuses, since distribution of a large quantity of packets to a plurality of servers is processed by the VNFs, there is a problem in that significant packet discarding occurs when the traffic to be distributed exceeds a certain quantity, even if SR-IOV is used. This may limit the maximum amount of traffic that can be passed by the VNFs in advance.

In order to solve the above problem, apparatuses have been proposed which reduce CPU load by efficiently distributing received packets. For example, Patent Literature 1 realizes a packet distribution method in which both load balancing control and priority control of received packets are achieved. FIGS. 6 and 7 show a configuration example and an operation example of a network load balancing apparatus of Patent Literature 1.

In Patent Literature 1, priority control is realized by calculating a hash value with respect to a specific region of a received packet, comparing the calculated hash value with a hash value registered in a priority path selection table, and if the values match, transferring the received packet to a data buffer (S4-1 to S4-4) registered in the priority path selection table. On the other hand, if the calculated hash value does not match the hash value registered in the priority path selection table, the hash value is reported to a load balancing control unit 30, and the packet is transferred to a data buffer registered in a load balancing path selection table while being subjected to load balancing (S4-5 to S4-8).

CITATION LIST

Patent Literature

Patent Literature 1: Japanese Patent Laid-Open No. 2017-139597.

Non-Patent Literature

Non-Patent Literature 1: "Intel Ethernet(R) Controller XL710 Datasheet", 2015 <http://www.intel.com/content/dam/www/public/us/en/documents/datasheets/xl710-10-40-controller-datasheet.pdf>.

SUMMARY

Technical Problem

The network load balancing apparatus of Patent Literature 1 is able to realize high throughput of VNFs without packet reordering, through flexible priority control and load balancing processing utilizing hash values. However, the configuration of Patent Literature 1 only considers packet transfer to a CPU of a VNF as the destination of distribution to the data buffers and does not perform distribution considering transfer to an external server of the VNF. There was therefore a problem in that the load in the CPU of the VNF due to packet transfer to an external server could not be reduced, resulting in decreased throughput of the VNF.

Embodiments of the present invention were made in order to solve the above problem, and have an object of providing a network load balancing apparatus that reduces a load in a VNF due to packet transfer to an external server, to realize a high throughput of the VNF.

Solution to Problem

In order to solve the above problem, a network load balancing apparatus according to embodiments of the present invention includes a data buffer provided to each communication path of transfer destinations of a received packet; a hash value calculation unit that calculates a first hash value using a field value contained in the packet; an external transfer control unit that determines a communication path of a transfer destination of the packet to be subject to external transfer control for transmission to a predetermined external server, based on the first hash value or the field value; a priority control unit that determines a communication path of a transfer destination of the packet to be subject to priority control, based on the first hash value; a load balancing control unit that determines a communication path of a transfer destination of the packet to be subject to load balancing control, to match a preset load balancing situation of the data buffer, based on the first hash value or a second hash value based on the first hash value; and a packet transfer control unit that, in accordance with the communication path of the transfer destination determined by one of the priority control unit, the load balancing control unit, and the external transfer control unit, transmits the packet to a data buffer corresponding to the communication path of the transfer destination.

In addition, the external transfer control unit may include a control object selection table storing in advance values that can be the first hash value or the field value in association with the communication paths of the transfer destinations; and a control object transfer control unit that, in case a value identical to the first hash value or the field value is stored in the control object selection table, acquires information of the communication path of the transfer destination corresponding to the first hash value or the field value from the control object selection table and reports the information to the packet transfer control unit.

In addition, the priority control unit may include a priority path selection table storing in advance values that can be the first hash value in association with communication paths of transfer destinations; and a priority path control unit that, in case a value identical to the first hash value is stored in the priority path selection table, acquires information of the communication path of the transfer destination corresponding to the first hash value from the priority path selection table and reports the information to the packet transfer control unit.

In addition, the load balancing control unit may include a load balancing path selection table storing in advance values that can be the first hash value or the second hash value in association with communication paths of transfer destinations usable in load balancing control, to match a load balancing situation of the data buffer; and a load balancing path control unit that, in case a value identical to the first hash value or the second hash value is stored in the load balancing path selection table, acquires information of the communication path of the transfer destination corresponding to the first hash value or the second hash value from the load balancing path selection table and reports the information to the packet transfer control unit.

In order to solve the above problem, a network load balancing method according to embodiments of the present invention is a network load balancing method that controls transfer to a data buffer provided to each communication path of transfer destinations of received packets, the method includes a hash value calculation step of calculating a first hash value using a field value contained in a received packet; an external transfer control step of determining a communication path of a transfer destination of the packet to be subject to external transfer control for transmission to a predetermined external server, based on the first hash value or the field value; a priority control step of determining a communication path of a transfer destination of the packet to be subject to priority control, based on the first hash value; a load balancing control step of determining a communication path of a transfer destination of the packet to be subject to load balancing control, to match a preset load balancing situation of the data buffer, based on the first hash value or a second hash value based on the first hash value; and a packet transfer control step of, in accordance with the communication path of the transfer destination determined in one of the priority control step, the load balancing control step, and the external transfer control step, transmitting the packet to a data buffer corresponding to the communication path of the transfer destination.

In addition, the external transfer control step may include a step of checking a control object selection table storing in advance values that can be the first hash value or the field value in association with the communication paths of the transfer destinations; and a step of, in case a value identical to the first hash value or the field value is stored in the control object selection table, acquiring and reporting information of the communication path of the transfer destination corresponding to the first hash value or the field value from the control object selection table.

In addition, the priority control step may include a step of checking a priority path selection table storing in advance values that can be the first hash value in association with communication paths of transfer destinations; and a step of, in case a value identical to the first hash value is stored in the priority path selection table, acquiring and reporting information of the communication path of the transfer destination corresponding to the first hash value from the priority path selection table.

In addition, the load balancing control step may include a step of checking a load balancing path selection table storing in advance values that can be the first hash value or the second hash value in association with communication paths of transfer destinations usable in load balancing control, to match a load balancing situation of the data buffer; and a step of, in case a value identical to the first hash value or the second hash value is stored in the load balancing path selection table, acquiring and reporting information of the communication path of the transfer destination corresponding to the first hash value or the second hash value from the load balancing path selection table.

Effects of Embodiments of the Invention

According to embodiments of the present invention, a network load balancing apparatus can be provided that determines packets to be transferred to an external server and transfers received packets directly to an external server, thereby reducing a load in a VNF due to packet transfer to an external server, to realize a high throughput of the VNF.

DETAILED DESCRIPTION OF ILLUSTRATIVE EMBODIMENTS

Embodiments of the present invention are described below with reference to the drawings. The present invention can be implemented in various embodiments and is not limited to the embodiments shown below.

First Embodiment

<Network Load Balancing Apparatus>

Figure 1:
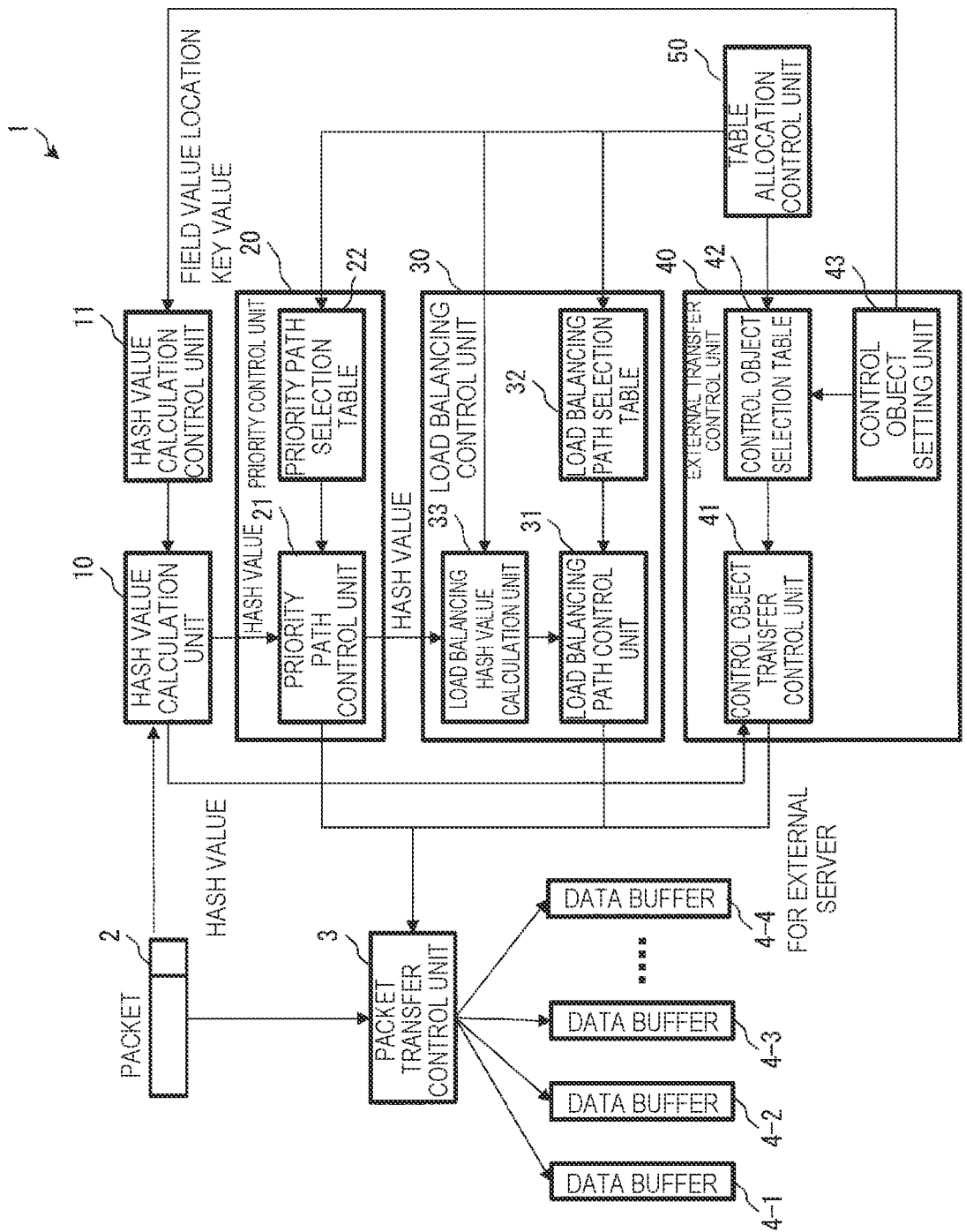
FIG. 1 is a block diagram showing a configuration example of a network load balancing apparatus according to a first embodiment of the present invention.

FIG. 1 is a block diagram showing a configuration example of a network load balancing apparatus according to an embodiment of the present invention. The network load balancing apparatus according to an embodiment of the present invention is envisaged to be used at a packet receiving end, and data in the form of packets is input into the network load balancing apparatus. A packet generally has, as header data, additional data representing the attributes of the packet, such as the packet field value etc.

A network load balancing apparatus 1 includes a hash value calculation unit 10, a hash value calculation control unit 11, a priority control unit 20, a load balancing control unit 30, an external transfer control unit 40, data buffers (4-1 to 4-4), a table allocation control unit 50, and a packet transfer control unit 3. It differs from a conventional configuration in that it includes an external transfer control unit that selects a data buffer depending on whether the destination is a VNF within the same server or an external server. Further, although the configuration example of FIG. 1 includes four data buffers (4-1 to 4-4) provided to respective communication paths of the destinations of the packets, the number of data buffers is not so limited.

The network load balancing apparatus 1 can be realized using a device such as a field-programmable gate array (FPGA) or application-specific integrated circuit (ASIC) and a program running on the device or circuit data of the device. In the case of a program, a processor of the device executes a process according to a program stored in a memory to function as a network load balancing apparatus. In addition, the network load balancing apparatus may also be realized using a program on an apparatus such as a commonly used switch or router, or a virtual switch on a general-purpose server.

<Hash Calculation Unit>

Upon receipt of the packet 2, the hash value calculation unit 10 of the network load balancing apparatus 1 acquires a field value at a predetermined location in the header data of the received packet 2, and calculates a unique hash value of the attributes of the packet from the acquired field value and a preset key value. The calculated hash value is reported to the priority control unit 20 etc.

Here, the location of the field value to be acquired in the header data of the packet 2 is preset in the hash value calculation unit 10 from the outside via the hash value calculation control unit 11. Likewise, the key value may also be preset from the outside via the hash value calculation control unit 11. Another possible configuration is one in which the location of the field value and the key value are set from an external terminal such as a control object setting unit 43 of the external transfer control unit 40.

If the location of the field value in the header data to be acquired can be designated from the outside, a packet identification process can be realized with respect to any field value of any length, rather than the fixed field value as disclosed in Non-Patent Literature 1. In addition, it is also possible to handle special conditions, such as acquiring field values from a plurality of fields, which ensures scalability in the future.

<External Transfer Control Unit>

The external transfer control unit 40 is a block for determining to which external server to transfer the received packet 2. The external transfer control unit 40 is composed of a control object transfer control unit 41, a control object selection table 42, and a control object setting unit 43.

The control object setting unit 43 of the external transfer control unit 40 registers information of an external server on which an administrator wants to perform load balancing/priority control using the apparatus. A common 5-tuple information (source IP address, destination IP address, source port number, destination port number, protocol) may be designated as the information of the external server, but information other than 5-tuple may also be registered. The control object setting unit 43 may also be configured to set the location of the field value and the key value with respect to the hash value calculation control unit 11.

A value that can be the hash value calculated by the hash value calculation unit 10 and communication paths of destinations are associated with each other and stored in advance in the control object selection table 42 of the external transfer control unit 40. The contents of the control object selection table 42 may be preset by the table allocation control unit 50. The value that can be the hash value calculated by the hash value calculation unit 10 is set based on the information of the external server that is the control object.

Regarding the communication paths of the destinations in the configuration example of FIG. 1, out of the data buffers to which the packet transfer control unit 3 is able to transfer (4-1 to 4-4) a data buffer for an external server of the NFV (e.g. data buffer 4-4) is stored. The hash value and the destination may correspond 1:1 or otherwise.

The control object transfer control unit 41 of the external transfer control unit 40 checks the control object selection table 42 to confirm whether a communication path of a transfer destination corresponding to the hash value is present. In case a communication path of a transfer destination corresponding to the hash value is present, the control object transfer control unit 41 reports the communication path of the corresponding transfer destination to the packet transfer control unit 3, to transfer the received packet 2 to the corresponding communication path. The packet transfer control unit 3 can transfer the packet that is to be the control object to an external server via the data buffer 4-4 for an external server in accordance with the settings of the control object selection table 42. On the other hand, if no corresponding combination exists, the external transfer control unit 40 shifts the process to the priority control unit 20.

In the embodiment described above, the determination of whether to transfer the received packet to the external server is carried out based on the hash value calculated by the hash value calculation unit 10. In another embodiment, the MAC address and IP address of the external server, which constitute the field value of the packet, may be stored in the control object selection table 42, and the determination of whether to transfer the received packet to the external server may be carried out based on the MAC address and IP address extracted from the received packet. In that case, the information of the MAC address and the IP address may be registered in the control object selection table 42 by the control object setting unit 43.

<Priority Control Unit>

The priority control unit 20 is composed of a priority path control unit 21 and a priority path selection table 22. A value that can be the hash value calculated by the hash value calculation unit 10 and communication paths of destinations are associated with each other and stored in advance in the priority path selection table 22 of the priority control unit 20. The contents of the priority path selection table are preset via the table allocation control unit 50.

The priority path control unit 21 of the priority control unit 20 checks the hash value (first hash value) calculated by the hash value calculation unit 10 against the priority path selection table 22, and if a value identical to the hash value calculated by the hash value calculation unit 10 is registered in the priority path selection table 22, acquires information of a communication path of a destination corresponding to this hash value from the priority path selection table 22 and reports the information of the communication path of the destination to the packet transfer control unit 3. On the other hand, if a value identical to the hash value calculated by the hash value calculation unit 10 is not registered in the priority path selection table 22, the hash value calculated by the hash value calculation unit 10 is reported to the load balancing control unit 30.

<Load Balancing Control Unit>

The load balancing control unit 30 is composed of a load balancing path control unit 31, a load balancing path selection table 32, and a load balancing hash value calculation unit 33. A value that can be a hash value calculated by the load balancing hash value calculation unit 33 and communication paths of destinations are associated with each other and stored in advance in the load balancing path selection table 32 of the load balancing control unit 30.

The load balancing hash value calculation unit 33 of the load balancing control unit 30 calculates a hash value (second hash value) used in a load balancing process from the hash value calculated by the hash value calculation unit 10 and information of specific destinations usable in load balancing control. Specifically, for example, the hash value calculated by the hash value calculation unit 10 may be divided by the number of communication paths of the destinations usable in load balancing control (the number of data buffers 4-1 to 4-3 usable in load balancing control).

The hash value calculated by the hash value calculation unit 10 is a value unique to the attribute of a packet. On the other hand, since the hash value calculated by the load balancing hash value calculation unit 33 is not necessarily a value unique to the attribute of a packet, there may be a case in which identical hash values are calculated for different packet attributes.

The communication paths of the destinations (data buffers 4-1 to 4-3) include those that are only used in priority control, those that are only used in load balancing control, and those that are shared between priority control and load balancing control, and of the communication paths of the destinations usable in load balancing control there are those that are only used in load balancing control and those that are shared between priority control and load balancing control. Information of the communication paths of the destinations (data buffers 4-1 to 4-3) usable in load balancing control may be preset via the table allocation control unit 50.

The load balancing path control unit 31 of the load balancing control unit 30 checks the hash value calculated by the load balancing hash value calculation unit 33 against the load balancing path selection table 32, acquires information of a communication path of a destination corresponding to the hash value calculated by the load balancing hash value calculation unit 33 from the load balancing path selection table 32, and notifies the packet transfer control unit 3.

<Packet Transfer Control Unit>

In accordance with the information of the communication path of the destination reported by the priority control unit 20, the load balancing control unit 30, or the external transfer control unit 40, the packet transfer control unit 3 transmits the received packet to one of the data buffers (4-1 to 4-3) that corresponds to the communication path of the destination, or to the data buffer 4-4 for an external server.

In case information of the communication path of the destination has been reported by the object control transfer control unit 41 of the external transfer control unit 40, the packet transfer control unit 3 transmits the packet to the data buffer 4-4 corresponding to the communication path of the reported destination. The received packet 2 is appropriately output from the data buffer 4-4 to a corresponding external server communication path and is transmitted to a destination external server.

In case information of the communication path of the destination has been reported by the priority path control unit 21 of the priority control unit 20, the packet transfer control unit 3 transmits the packet 2 to a data buffer of the data buffers (4-1 to 4-3) corresponding to the communication path of the destination reported by the priority path control unit 21. In case information of the communication path of the destination has been reported by the load balancing path control unit 31 of the load balancing control unit 30, the packet transfer control unit 3 transmits the packet 2 to a data buffer corresponding to the communication path of the reported destination.

In FIG. 1, only one data buffer 4-4 for an external server communication path is shown, but a plurality of data buffers for external servers may be included. In a configuration including a plurality of data buffers for external servers, a balancing process flow similar to the load balancing control may be used in the determination of which data buffer to which the packet is to be transmitted.

<Load Balancing Path Selection Table>

The method of creating the load balancing path selection table 32 of the load balancing control unit 30 will now be described. In order to create the load balancing path selection table 32, in addition to all values that can be the hash value calculated by the load balancing hash value calculation unit 33 and the information of communication paths of destinations usable in load balancing control (data buffers 4-1 to 4-3), preset load balancing setting data defining a load balancing situation of the data buffers is used.

When distributing packets to usable data buffers based on the hash value calculated by the load balancing hash value calculation unit 33, the communication path of the destination is determined so that it matches the load balancing situation of the data buffers defined by the preset load balancing setting data. By associating the hash value to the communication path of the destination according to the preset load balancing setting data, the received packet can be transmitted to the data buffer while performing predetermined load balancing.

It should be noted that the load balancing path selection table 32 may be set within the load balancing control unit 30 as described above, but the load balancing path selection table 32 may also be created outside of the load balancing control unit 30 and set by the table allocation control unit 50.

<Operation of the Network Load Balancing Apparatus>

Figure 2:
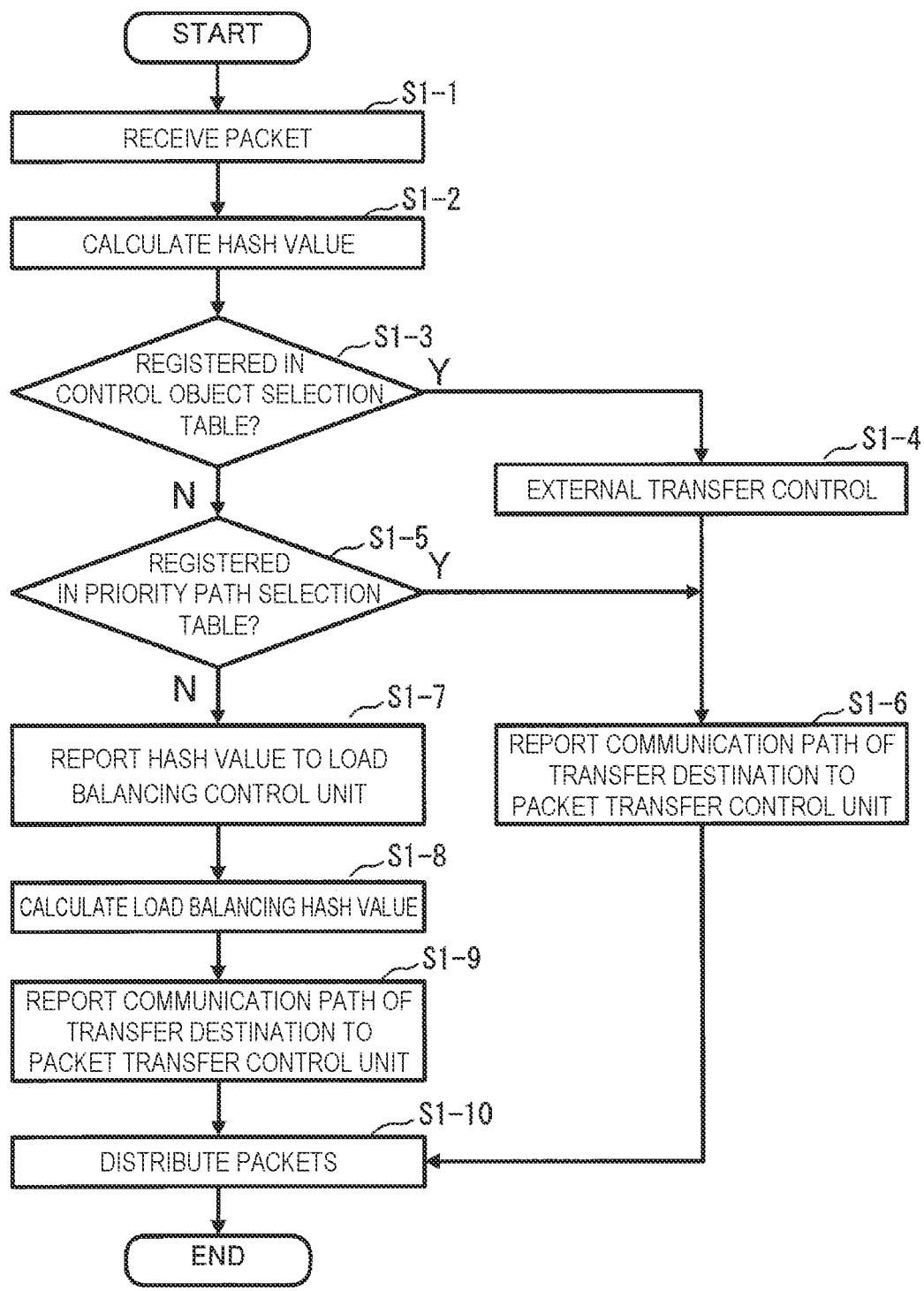
FIG. 2 is a flowchart showing an operation example of a network load balancing apparatus according to a first embodiment of the present invention.

FIG. 2 is a flowchart showing an operation example of the network load balancing apparatus according to a first embodiment of the present invention. The network load balancing apparatus receives a packet (S1-1), calculates a hash value using a field value of the received packet (S1-2), and determines, based on the calculated hash value, whether to transmit the received packet to an external server or whether to perform priority control or load balancing.

In the operation example of FIG. 2, the control object selection table is checked to confirm whether a communication path of a transfer destination corresponding to the hash value exists (S1-3), and in case a communication path of a transfer destination corresponding to the hash value exists, the communication path of the corresponding transfer destination is reported to the packet transfer control unit, and external transfer control is performed (S1-4, S1-6). On the other hand, in case no communication path of a transfer destination corresponding to the hash value exists, the processing flow shifts to a priority control process.

In the priority control process, the hash value is checked against the priority path selection table (S1-5), and in case a value identical to the hash value is registered in the priority path selection table, information of a communication path of a corresponding destination is acquired from the priority path selection table and reported to the packet transfer control unit (S1-6). On the other and, if a value identical to the hash value is not registered in the priority path selection table, the hash value calculated by the hash value calculation unit is reported to the load balancing control unit, and load balancing control is performed (S1-7).

In the load balancing control, a hash value (second hash value) is calculated based on the hash value calculated by the hash value calculation unit (first hash value) (S1-8), the load balancing path selection table is checked, and information of a communication path of a destination corresponding to the second hash value is acquired from the load balancing path selection table and reported to the packet transfer control unit (S1-9).

The packet transfer control unit, notified of the communication path of the destination, performs packet distribution by transmitting the packet to a data buffer corresponding to the communication path of the reported destination, according to the information of the communication path of the destination reported by the external transfer control unit, the priority control unit, or the load balancing control unit (S1-10).

In this way, according to the network load balancing apparatus according to the present embodiment, the network load balancing apparatus is configured to determine a packet to be transferred to an external server and directly transfer the received packet to the external server. Therefore, the network load balancing apparatus according to the present embodiment can reduce a load in a VNF due to packet transfer to an external server, to realize a high throughput of the VNF.

Further, the present embodiment, unlike the technique disclosed in Non-patent Literature 1, realizes free allocation of data buffers to be used in priority control, data buffers to be used in load balancing, and data buffers to be used in external transfer, which makes it possible to realize power-saving and efficient service on a chip, such as an NIC.

Further, by implementing a hash calculation suitable for data buffers usable in load balancing control in addition to the hash calculation for allocating data buffers in external transfer control and priority control, it is possible to avoid a decrease in throughput due to distribution of packets to specific data buffers while packets that are not subject to load balancing control are discarded. In addition, through packet identification and data buffer allocation by hash calculation, packet reordering can be guaranteed not to occur.

Second Embodiment

In the first embodiment, the second hash value was calculated by the load balancing hash value calculation unit of the load balancing control unit, but calculation of a hash value by the load balancing hash value calculation unit may be omitted, and the hash value calculated by the hash value calculation unit 10 may be used in load balancing control as is.

Figure 3:
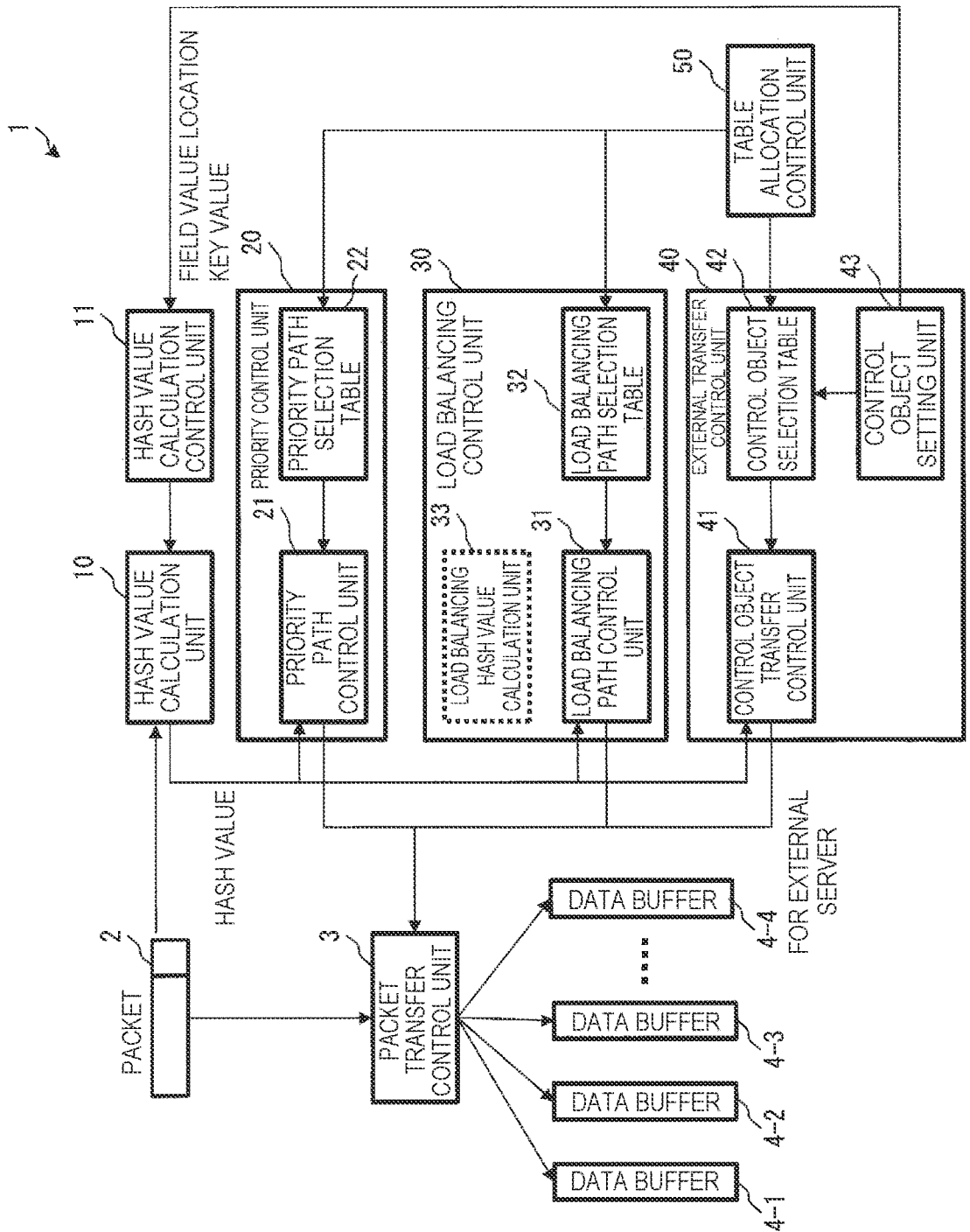
FIG. 3 is a block diagram showing a configuration example of a network load balancing apparatus according to a second embodiment of the present invention.

FIG. 3 is a block diagram showing a configuration example of a network load balancing apparatus according to a second embodiment of the present invention. In FIG. 3, the apparatus is configured such that the hash value calculated by the hash value calculation unit 10 is transmitted to the priority control unit 20, the load balancing control unit 30, and the external transfer control unit 40. The load balancing path control unit 31 of the load balancing control unit 30 checks the load balancing path selection table 32, acquires information of a communication path of a destination corresponding to the hash value calculated by the hash value calculation unit 10 from the load balancing path selection table 32, and reports it to the packet transfer control unit 3.

The load balancing path selection table according to the second embodiment may be configured in a similar way as in the first embodiment. In the load balancing path selection table, when distributing packets to usable data buffers according to the hash value using all values that can be the hash value calculated by the hash value calculation unit, the information of the communication paths of the destinations usable in load balancing control, and the preset load balancing setting data, the communication paths of the destinations may be set so that the load situation of each data buffer matches the load balancing situation defined by the load balancing setting data.

Figure 4:
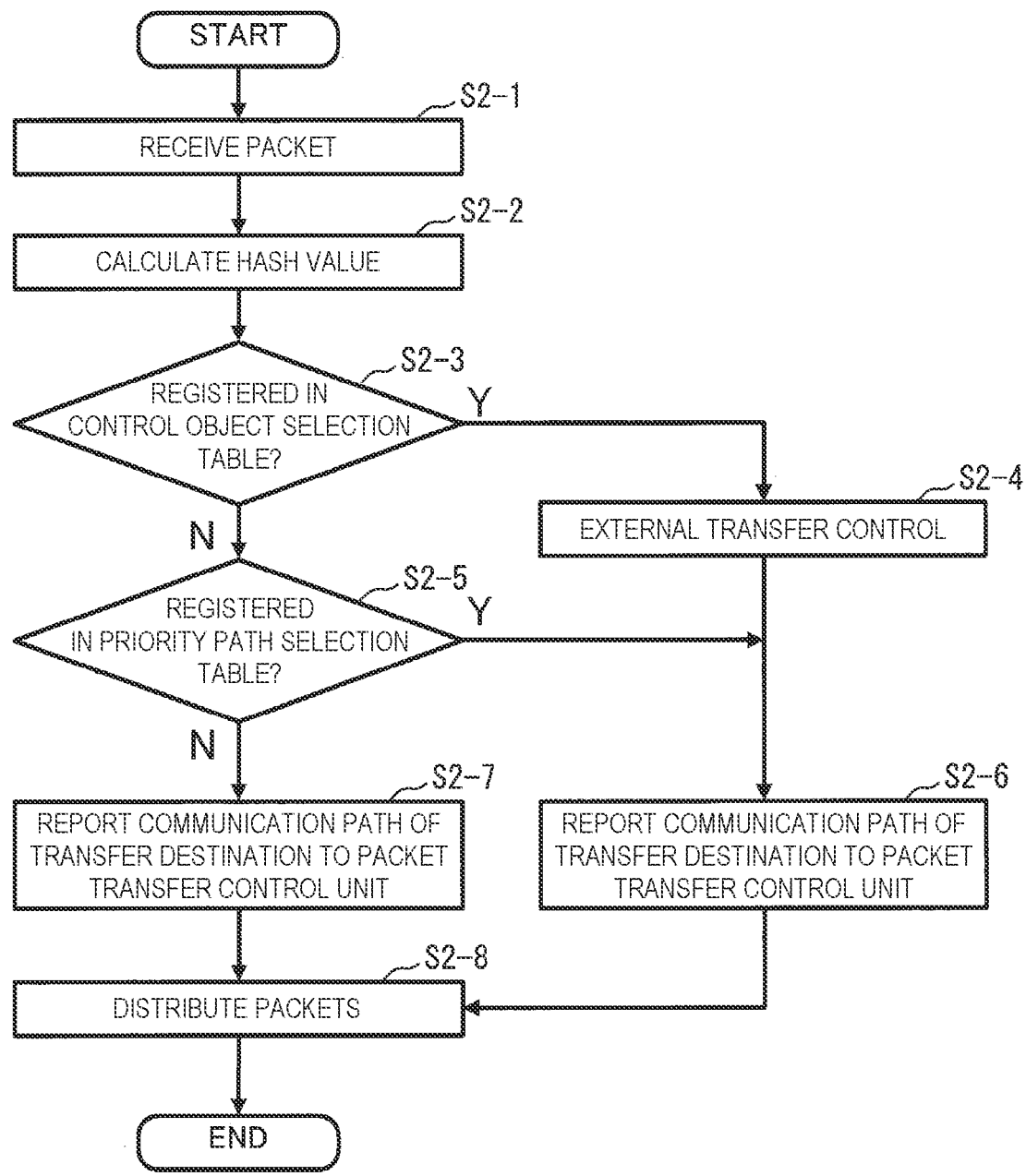
FIG. 4 is a flowchart showing an operation example of a network load balancing apparatus according to a second embodiment of the present invention.

FIG. 4 is a flowchart showing an operation example of a network load balancing apparatus according to a second embodiment of the present invention. In the operation example of FIG. 4, the priority control unit does not report the hash value to the load balancing control unit and the load balancing control unit does not calculate a hash value, but the load balancing control unit determines the communication path of the transfer destination and reports it to the packet transfer control unit.

Figure 5:
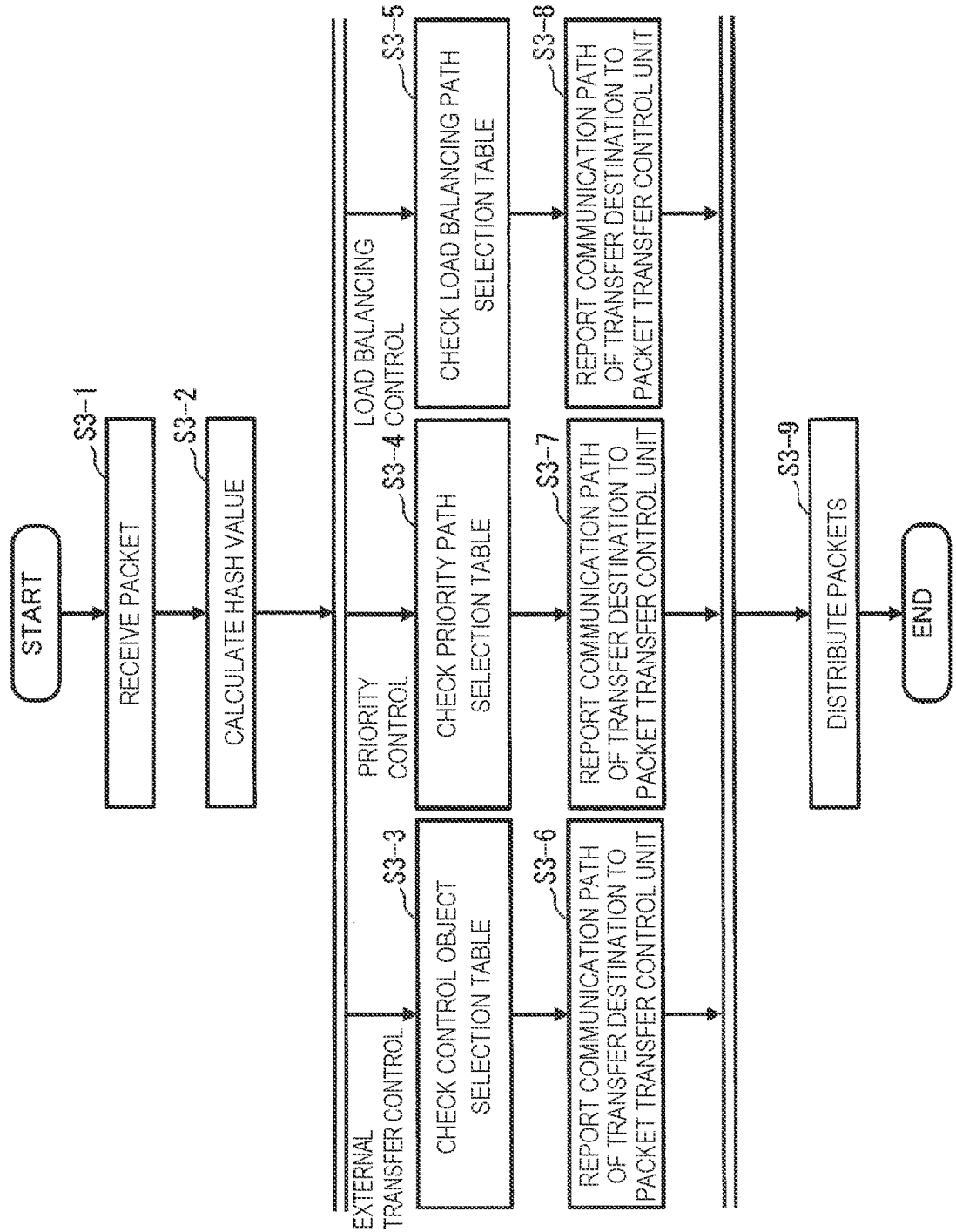
FIG. 5 is a flowchart showing another operation example of a network load balancing apparatus according to a second embodiment of the present invention.
Figure 6:
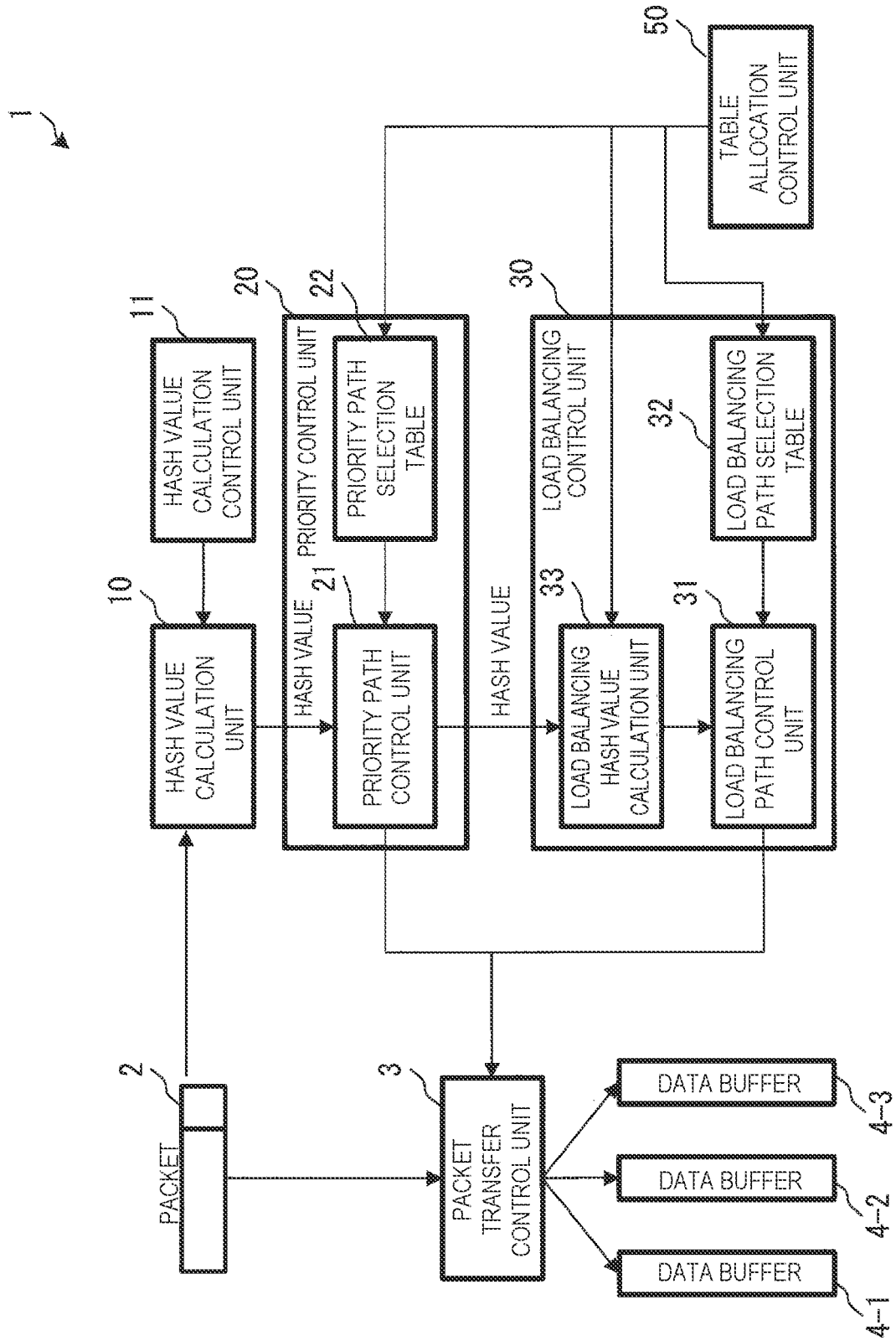
FIG. 6 is a block diagram showing a configuration example of a conventional network load balancing apparatus.
Figure 7:
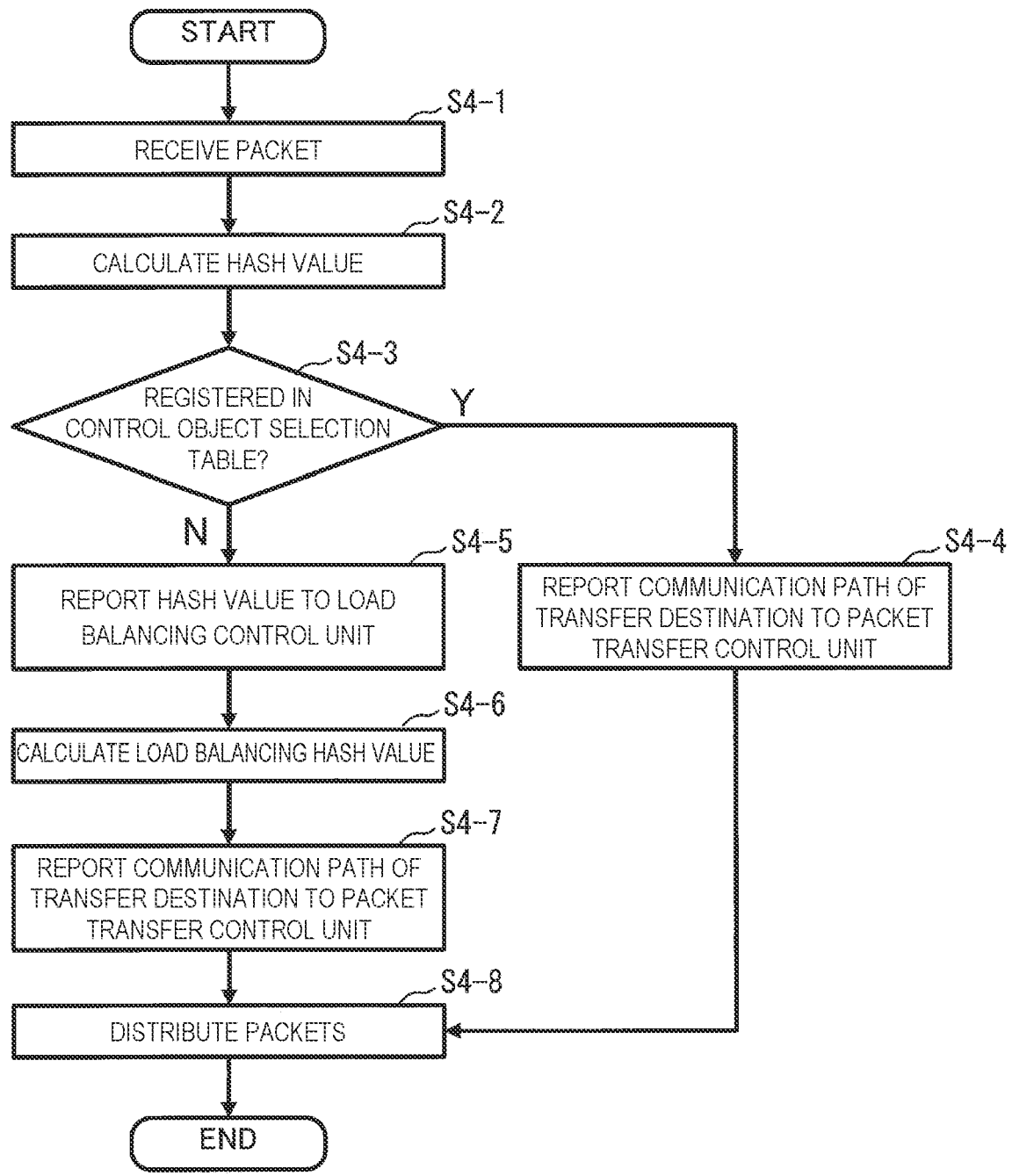
FIG. 7 is a flowchart showing an operation example of a conventional network load balancing apparatus.

As shown in FIG. 4, the determination of whether the hash value is registered in the control object selection table (S2-3) and the determination of whether the hash value is registered in the priority path selection table (S2-5) may be performed in order, or, as shown in FIG. 5, the checking of the control object selection table (S3-3), priority path selection table (S3-4), and load balancing path selection table (S3-5) and the reporting of the communication path (S3-6, S3-7, and S3-8) may be performed in parallel.

Moreover, in a case where information of the communication path of the destination has been reported by both of the priority control unit/load balancing control unit and the external transfer control unit for the same packet, the communication path reported by the external transfer control unit is prioritized, but the communication path to prioritize may be changed.

The network load balancing apparatus according to the embodiments of the present invention may be a circuit, or a device. Although the network load balancing apparatus shown in the embodiments of the present invention is the best embodiment with a configuration including a priority control processing function that realizes a QoS function and a load balancing processing function that realizes a high throughput, the network load balancing apparatus may also be realized as firmware stored in a ROM and hardware such as a reconfigurable device, element, substrate, wiring, etc. Further, the network load balancing apparatus according to the present invention may be configured by a combination of software and hardware, and further as a combination with firmware.

Here, the firmware and software is stored as a program on a recordable medium such as a magnetic disk, a flexible disk, an optical disc, a compact disc, a minidisc, a DVD, etc. The program is read and executed by a CPU. The program causes a computer to function as the network load balancing apparatus according to embodiments of the present invention, or causes the computer to execute the steps of the network load balancing apparatus.

INDUSTRIAL APPLICABILITY

Embodiments of the present invention can be applied to packet destination control implemented on low-resource hardware.

REFERENCE SIGNS LIST

1 Network load balancing apparatus
2 Packet
3 Packet transfer control unit
4-1 to 4-4 Data buffer
10 Hash value calculation unit
11 Hash value calculation control unit
20 Priority control unit
21 Priority path control unit
22 Priority path selection table
30 Load balancing control unit
31 Load balancing path control unit
32 Load balancing path selection table
33 Load balancing hash value calculation unit
40 External transfer control unit
41 Control object transfer control unit
42 Control object selection table
43 Control object setting unit
50 Table allocation control unit

The invention claimed is:

1. A network load balancing apparatus on a first server, the network load balancing apparatus comprising:
a plurality of data buffers, the plurality of data buffers comprising a data buffer for each communication path for each transfer destination of one or more received packets;
a hash value calculator configured to calculate a first hash value using a field value contained in a received packet;
an external transfer controller configured to determine a first communication path of a transfer destination of the received packet when the received packet is to be subject to external transfer control for transmission to a predetermined external server, based on the first hash value or the field value, the predetermined external server being different from the first server, the first communication path corresponding to a first data buffer of the plurality of data buffers, and the first data buffer being dedicated to the predetermined external server;
a priority controller configured to determine a second communication path of the transfer destination of the received packet when the received packet is to be subject to priority control, based on the first hash value, the second communication path corresponding to one or more second data buffers of the plurality of data buffers, and the one or more second data buffers being dedicated to one or more virtual network functions (VNFs) provided by the first server;
a load balancing controller configured to determine a third communication path of the transfer destination of the received packet when the received packet is to be subject to load balancing control, to match a preset load balancing situation of the one or more second data buffers of the plurality of data buffers corresponding to the third communication path, based on the first hash value or a second hash value based on the first hash value; and
a packet transfer controller configured to, in accordance with the first, second, or third communication path of the transfer destination determined by one of the priority controller, the load balancing controller, or the external transfer controller, transmit the received packet to:
the first data buffer dedicated to the predetermined external server and corresponding to the first communication path; or
the one or more second data buffers dedicated to the one or more VNFs provided by the first server and corresponding to the second or third communication path.

2. The network load balancing apparatus according to claim 1, wherein the external transfer controller comprises:
a control object selection table configured to store in advance values that can be the first hash value or the field value in association with the first communication path of the transfer destination; and
a control object transfer controller configured to, in case a value identical to the first hash value or the field value is stored in the control object selection table, acquire information of the first communication path of the transfer destination corresponding to the first hash value or the field value from the control object selection table and report the information to the packet transfer controller.

3. The network load balancing apparatus according to claim 1, wherein the priority controller comprises:
a priority path selection table configured to store in advance values that can be the first hash value in association with the second communication path of the transfer destination; and
a priority path controller configured to, in case a value identical to the first hash value is stored in the priority path selection table, acquire information of the second communication path of the transfer destination corresponding to the first hash value from the priority path selection table and report the information to the packet transfer controller.

4. The network load balancing apparatus according to claim 1, wherein the load balancing controller comprises:
- a load balancing path selection table configured to store in advance values that can be the first hash value or the second hash value in association with the third communication path of the transfer destination usable in load balancing control, to match a load balancing situation of the one or more second data buffers; and
- a load balancing path controller configured to, in case a value identical to the first hash value or the second hash value is stored in the load balancing path selection table, acquire information of the third communication path of the transfer destination corresponding to the first hash value or the second hash value from the load balancing path selection table and report the information to the packet transfer controller.

5. A network load balancing method performed by a network load balancing apparatus on a first server, the network load balancing method comprising:
- a packet receiving step of receiving one or more packets, wherein the network load balancing apparatus comprises a plurality of data buffers, and wherein the plurality of data buffers comprises a data buffer for each communication path of each transfer destination of the one or more packets;
- a hash value calculation step of calculating a first hash value using a field value contained in a received packet;
- an external transfer control step of determining a first communication path of a transfer destination of the received packet when the received packet is to be subject to external transfer control for transmission to a predetermined external server, based on the first hash value or the field value, the predetermined external server being different from the first server, the first communication path corresponding to a first data buffer of the plurality of data buffers, and the first data buffer being dedicated to the predetermined external server;
- a priority control step of determining a second communication path of the transfer destination of the received packet when the received packet is to be subject to priority control, based on the first hash value, the second communication path corresponding to one or more second data buffers of the plurality of data buffers, and the one or more second data buffers being dedicated to one or more virtual network functions (VNFs) provided by the first server;
- a load balancing control step of determining a third communication path of the transfer destination of the received packet when the received packet is to be subject to load balancing control, to match a preset load balancing situation of the one or more second data buffers of the plurality of data buffers corresponding to the third communication path, based on the first hash value or a second hash value based on the first hash value; and
- a packet transfer control step of, in accordance with the first, second, or third communication path of the transfer destination determined in one of the priority control step, the load balancing control step, or the external transfer control step, transmitting the received packet to:
  - the first data buffer dedicated to the predetermined external server and corresponding to the first communication path; or
  - the one or more second data buffers dedicated to the one or more VNFs provided by the first server and corresponding to the second or third communication path.

6. The network load balancing method according to claim 5, wherein the external transfer control step comprises:
- a step of checking a control object selection table storing in advance values that can be the first hash value or the field value in association with the first communication path of the transfer destination; and
- a step of, in case a value identical to the first hash value or the field value is stored in the control object selection table, acquiring and reporting information of the first communication path of the transfer destination corresponding to the first hash value or the field value from the control object selection table.

7. The network load balancing method according to claim 5, wherein the priority control step comprises:
- a step of checking a priority path selection table storing in advance values that can be the first hash value in association with the second communication path of the transfer destination; and
- a step of, in case a value identical to the first hash value is stored in the priority path selection table, acquiring and reporting information of the second communication path of the transfer destination corresponding to the first hash value from the priority path selection table.

8. The network load balancing method according to claim 5, wherein the load balancing control step comprises:
- a step of checking a load balancing path selection table storing in advance values that can be the first hash value or the second hash value in association with the third communication path of the transfer destination usable in load balancing control, to match a load balancing situation of the third data buffer; and
- a step of, in case a value identical to the first hash value or the second hash value is stored in the load balancing path selection table, acquiring and reporting information of the third communication path of the transfer destination corresponding to the first hash value or the second hash value from the load balancing path selection table.

* * * * *